(12) United States Patent
Chhabra et al.

(10) Patent No.: US 10,628,803 B1
(45) Date of Patent: Apr. 21, 2020

(54) DIAL HOME OPTIMIZER

(71) Applicant: EMC IP Holding Company LLC, Hopkinton, MA (US)

(72) Inventors: Nitin Chhabra, Bangalore (IN); Prakash Chanderia, Bangalore (IN); Ajith Balakrishnan, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 100 days.

(21) Appl. No.: 15/283,577

(22) Filed: Oct. 3, 2016

(51) Int. Cl.
*G06Q 10/00* (2012.01)
*H04L 12/26* (2006.01)

(52) U.S. Cl.
CPC .......... *G06Q 10/20* (2013.01); *H04L 43/065* (2013.01); *H04L 43/0817* (2013.01); *H04L 43/12* (2013.01)

(58) Field of Classification Search
CPC ... H04L 29/08072; H04L 29/06; H04L 43/00; H04L 12/2602; H04L 41/22
USPC ........................................................ 709/224
See application file for complete search history.

(56) References Cited

U.S. PATENT DOCUMENTS

| | | | | |
|---|---|---|---|---|
| 9,166,997 | B1* | 10/2015 | Guo ................... | H04L 63/1433 |
| 2005/0132206 | A1* | 6/2005 | Palliyil ................ | G06F 21/566 |
| | | | | 713/188 |
| 2008/0320486 | A1* | 12/2008 | Bose ..................... | G06Q 10/06 |
| | | | | 718/105 |
| 2009/0232406 | A1* | 9/2009 | Saisan .................... | G01S 15/88 |
| | | | | 382/224 |
| 2011/0019812 | A1* | 1/2011 | Sankaranarayanan ...................... | |
| | | | | H04M 3/523 |
| | | | | 379/266.01 |
| 2011/0173698 | A1* | 7/2011 | Polyakov ............ | G06F 11/0748 |
| | | | | 726/23 |
| 2015/0248832 | A1* | 9/2015 | Piccolo, III .......... | G08B 29/145 |
| | | | | 340/514 |

* cited by examiner

*Primary Examiner* — Hermon Asres
(74) *Attorney, Agent, or Firm* — Dergosits & Noah LLP; Todd A. Noah

(57) ABSTRACT

Described herein are methods and systems by which certain servicing and maintenance of a device coupled to a computer network can be performed remotely. The system receives an event associated with the operation of the device and compares the event to a set of rules to identify if the event is a false positive event. The system generates a notification when the event is not the false positive event and transmits the notification to a service agent.

16 Claims, 4 Drawing Sheets

DIAL HOME OPTIMIZER

BACKGROUND

Traditionally, when a customer experiences issues associated with a company's product, such as a computing device or software associated with the computing device, the customer must contact the company's technical support or servicing department. After receiving notification of an issue with the product, the company will dispatched a service agent to call, connect or visit the customer's site and service the product. In some circumstances, the company will have service agents visit a customer's site on a periodic basis to perform scheduled maintenance and resolve any issues. However, this traditional method of providing maintenance and service products has proven to be costly and inefficient.

Many companies have therefore implemented systems, such as "dial home systems", wherein client devices are constantly monitored for health and functionality. When an event requiring serving occurs, the system automatically notifies a service agent and transfers preliminary critical diagnostic data associated with the client device. By obtaining information in this way, the service agent can quickly identify problems and develop an action plan for problem resolution giving the client a more effective first contact support session and ultimately, an overall reduction in time to resolution.

However, there are drawbacks to such "dial home systems". In some cases, a client device may generate a false positive event that indicates that servicing may be required even though servicing may not be needed. For example, an anti-virus software running on a client's computer may detect a file as being infected with a virus, when in fact the file is not infected with the virus. Dealing with such false positive events can lead to wastage of time and resources for a company. Currently, when a "dial home" or a notification of the event is generated, there is no way to determine if the event indicates a legitimate issue where servicing for a product is needed or if the event is a false positive event before the notification is forwarded to a service agent. It is only after the service agent receives the notification and analyzes the event, that a determination as to the legitimacy of the need to service the product is made.

Companies have tried manage the occurrence of false positive events in several different ways. For example, if the event is determined to be a false positive event, the service agent may then create a knowledge base article to refer for future instances of same problem. However, false positive events will keep generating notifications that are forwarded to service agents to mark as false positive. In another example, the service agent may also engineer release a patch to correct the generation of the particular false positive event. However, engineering patches for each false positive event is costly and timely. In other circumstances, some dial home systems may disable particular dial home events on the fly so that false positives of the specified events can be avoided. However, the system may also disable genuine dial homes for the specified event. Each of these solutions for managing false positive events requires downtime to troubleshoot the system entity which generated dial home event.

The inventors have discovered that a system and method for detecting and managing false positive events prior to the false positive events being forwarded to a service agent is needed.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

The subject matter described herein provides for methods and systems by which certain servicing and maintenance of a network device can be performed remotely, such as from a centralized service agent, over a network. According to an embodiment, a server monitors network devices for events occurring in the device that indicate the device may need servicing, also referred to as "dial home events." The network devices may include shared network resources, such as a shared storage system, and/or client devices. The dial home events are analyzed to determine if they are false positive by executing a set of rules mapped to the dial home event. If the dial home event is determined to be a false positive, a notification of the dial home event is not generated. If the dial home event is determined to be positive, a notification of the dial home event is generated and sent to the centralized service agent.

Figure 1:
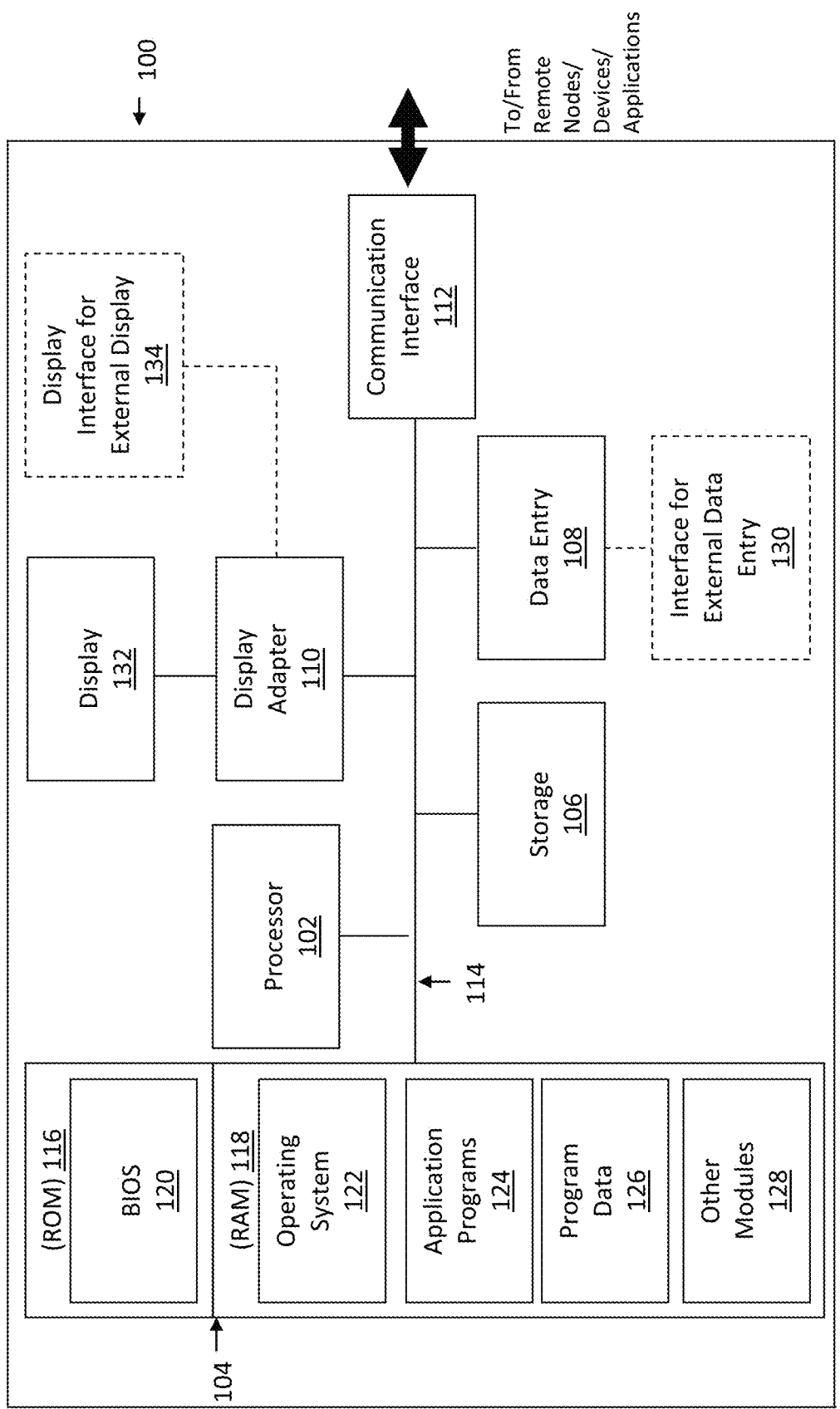
FIG. 1 is a block diagram illustrating an exemplary hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for calculating costs of application operations in a virtually provisioned environment.

Figure 2:
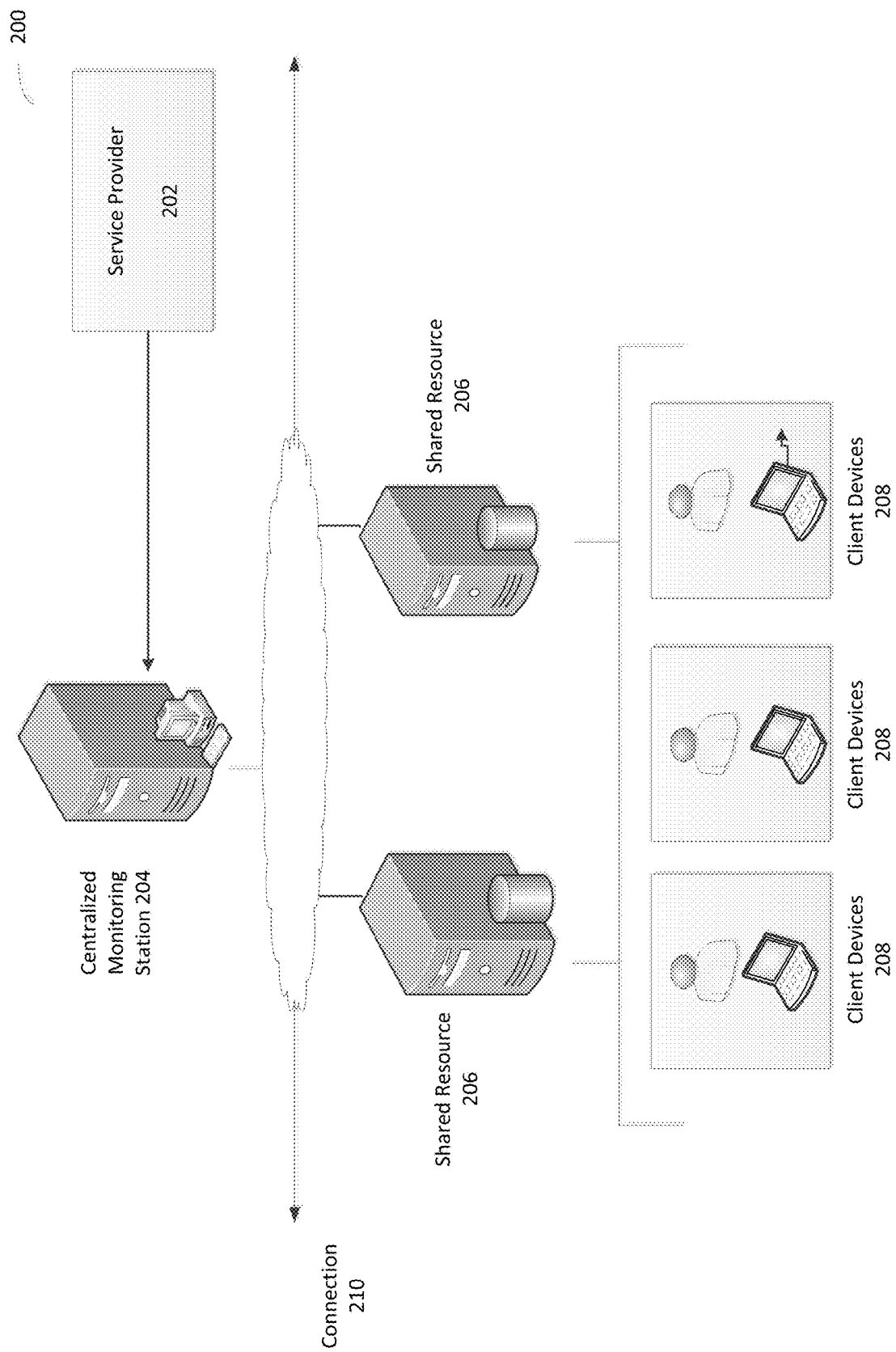
FIG. 2 is a block diagram illustrating an exemplary system for monitoring the health of a device.

FIG. 2 illustrates a block diagram of a health monitoring system, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users. In one embodiment, the system 200 may also represent a converged infrastructure in which the computer (server), the network and the storage are provided as a single optimized entity.

In an embodiment, the system 200 represents a cloud computing system that includes a client device or client devices 208, shared resources servers 206, a monitoring station servers 204, and service providers 202. The clients 208 and servers 206 and 204 communicate via a network 210. In one embodiment, an enterprise business uses the clients 208 to execute an enterprise application via the servers 206. The shared resource server 206 allocates a CPU resource, a memory resource, an I/O resource, and a network resource to process an enterprise application's operation in a virtually provisioned environment. FIG. 2 does not depict the location of an enterprise application because the operations of the enterprise application may be processed by any combination of the resources allocated by the server 206. In another embodiment client 208 may use servers 206 as a shared storage facility.

The shared resource server 206 communicates via a network 210 to a centralized monitoring station 204. The centralized monitoring station 204 monitors the shared resource server 206 for dial home events. In one embodiment, the client devices 208 may also communicate via the network 210, and the centralized monitoring station 204 may monitor the client devices 208 for dial home events in addition to monitoring the shared resource server 206.

In one embodiment, the shared resource server 206 and/or the client devices 208 being monitored may include software or an application that continuously polls the devices for their latest event log entries. To determine if any of the entries in the event log are dial home events, the event log entries may be analyzed by the software/application associated with the device or by the centralized monitoring station 204 using a dial home template filter file. To determine if any of the events are dial home events, there must be a match between the dial home template filter file and one of the events in the log.

In another embodiment, the shared resource server 206 and/or the client devices 208 being monitored may include software or an application that may continuously monitor for specific events, such as the dial home events. In some instances, the software or the application may receive commands from the centralized monitoring station 204 or the service provider 202 regarding what specific events to monitor. Different devices may require different monitoring commands.

In another embodiment, the centralized monitoring station 204 sends a heartbeat to the service provider 202 during regular intervals, such as every thirty seconds. Each heartbeat contains a small datagram that identifies the shared resource server 206 and/or the client devices 208 being monitored and updates of the status of the devices. When the shared resource server 206 and/or the client devices 208 detects the occurrence of a dial home event, the centralized monitoring station 204 receives an alert and determines if the event is a false positive event. During the next heartbeat, the alert is sent to the service provider 202 when the event is a false positive event.

Although FIG. 2 depicts the system 200 with three clients 208, two shared resource servers 206, one network 210, a centralized monitoring station 204, the system 200 may include any number of clients 208, shared resource servers 206, networks 210, and centralized monitoring stations 204. The system may also include any number of CPU resources, memory resources, I/O resources, network resources, and analysis applications. The clients 208, the shared resource servers 206 and centralized monitoring station 204 may each be substantially similar to the system 100 depicted in FIG. 1.

The centralized monitoring station 204 includes a storage comprising a set of rules that define events that are false positive events. When the monitoring station 204 receives a dial home event from the shared resource 206 and/or the client devices 208, the monitoring station 204 may analyze the dial home event. The monitoring station 204 determines whether an event is a false positive or not by executing a set of rules mapped to the dial home event. In one embodiment, the rules are written in a declarative syntax. The mapping of the rules to the events is specified within the rules. For example, a rule may be written as follows:

<Header>
{Event, Ruleid, "ActionForFP", "ActionForCorrection"}
</header>
<Body>
{ActionForFP}
{ActionForCorrection}
</Body>

In one embodiment, when a home dial event is received by the centralized monitoring station 204, the event is mapped to a rule by comparing the event to a set of rules, wherein each rule specifies which type of event the rule corresponds too. If the home dial event is mapped to a rule, it is identified as a false positive event. In other words, mapping the events to the set of rules can be specified to filter and transform events so that events that do not conform to the rules are not exposed.

In some instances, when the home dial event is transmitted by the shared resource server 206 and/or the client devices 208 to the centralized monitoring station 204, the shared resource server 206 and/or the client devices 208 may also transmit device parameters associated with the devices. Device parameters may include information associated with the state of the device, information about the type of device and system performance at the time of the home dial event and/or at the current time. For example, device parameters may include CPU utilization, memory consumption, RAID status, and the like. The centralized monitoring station 204 may use the device parameters in mapping the home dial event to the set of rules to identify if the dial home event is a false positive event.

In one embodiment, new rules may be dynamically added to the centralized monitoring station 204 without rebuilding the entire health monitoring platform. For example, as new false positive events occur, rules simply written in declarative syntax associated with detection of the new false positive events may be added to the rules already stored in the centralized monitoring station 204. This improvement over the prior art, allows the system to run new/modified rules without any significant change. This also means that the new rules can be shared across sites without engineering effort. Another additional benefit is existing rules can be modified based on actual experience on the site.

When the centralized monitoring station 204 determines a dial home event is false positive, the centralized monitoring station does not generate a notification of the dial home event. In the case event is not a false positive, the centralized monitoring station will try to take corrective action automatically if possible. If it fails or no corrective action is associated with a rule, then monitoring station 204 generates a notification of the dial home event and transmits the notification and device parameters associated with the dial home event to the service provider 202. Upon receiving the notification, the service provider 202 may contact client associated with the client device or the administrator of the shared resource 206 regarding the dial home event. The service provider 202 may provide feedback via e-mail, a voice call, a text message or any other form of communication.

Figure 3:
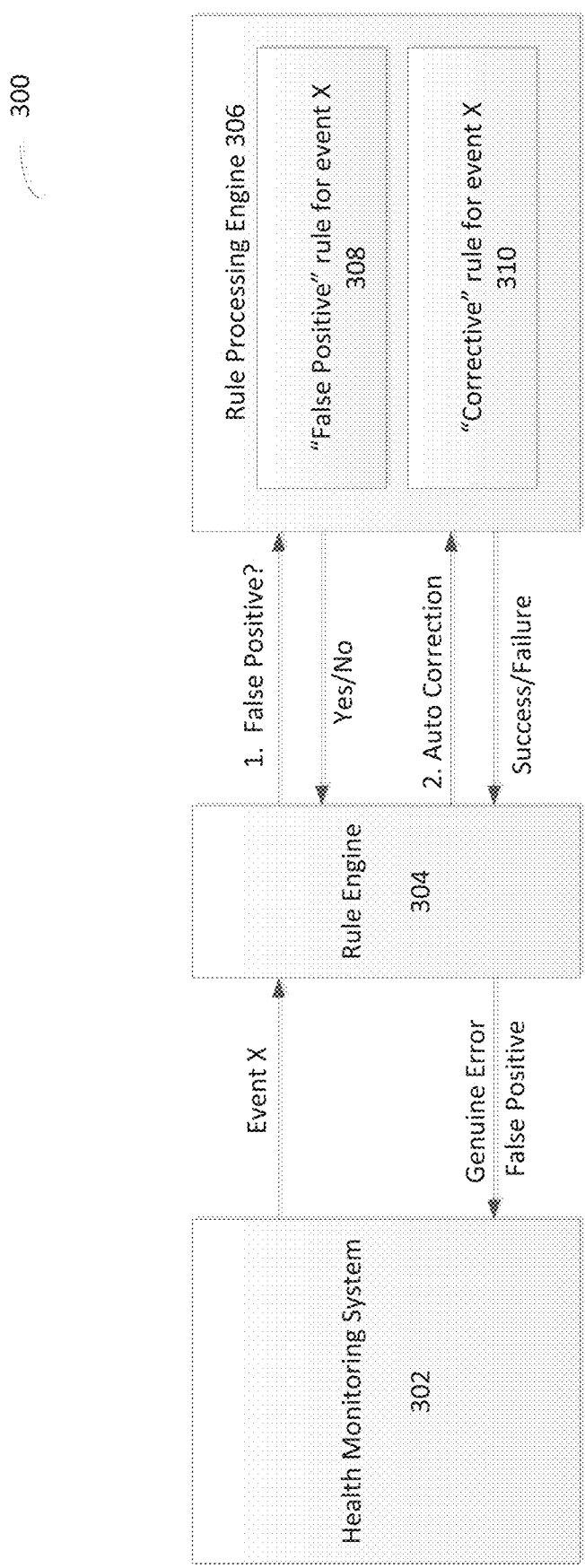
FIG. 3 is a block diagram illustrating an exemplary system for determining if a health event is a false positive event.

FIG. 3 is a block diagram that illustrates a method of determining a dial home event, under an embodiment. The block diagram 300 illustrates certain steps that are involved with the centralized monitoring system 204 of FIG. 2.

Upon receiving a dial home event generated by a client device 208 or a shared resource device 206, a health monitoring system analyzes 302 the dial home event to determine if it is a false positive event. The health monitoring system 302 may comprise a rule engine 304 and a rule processing engine 306. The rule engine 304 is responsible for managing the addition and removal rules in the repository of rules and execution of rules using rule processing engine 306. The rule engine 304 and the rule processing engine 306 may be components of a single server or may be separate components that communicate via a network.

The health monitoring system 302 receives a dial home event and transmits the event to the rule engine 304. The rule engine executes a set of rules mapped to the dial home event with the help of rule processing engine 306. In one embodiment, the rule engine comprises two sets of rules. A first set of rules for determining false positives and a second set of rules for auto correction. Mapping of rules to events is specified within the rules.

In one embodiment, the health monitoring system 302 may compare the received dial home event to the set of rules for determining if the dial home event is a false positive. The rule processing engine 306 applies the set of rules to the dial home event to determine if the dial home event is a false positive event. If the rule processing engine 306 determines that the dial home event is a false positive, a notification is generated and sent to the health monitory system via the rule engine 304, that the dial home event was an error and the dial home event is not forwarded to a service agent associated with the service provider. If the rule processing engine 306 determines that the dial home event is positive and service is needed at the client device or shared resource device, a notification is sent to the health monitoring system 302 via the rule engine 304 that the error was genuine. The health monitoring system will transmit a notification of the genuine error to the service agent associated with the service provider. The health monitoring system may also transmit information of the device associated with the error and other relevant information.

In one embodiment, if the rule processing engine 306 determines if the dial home event was a genuine error, the rule engine 304 may request the rule processing engine 306 to determine if there is an auto correction option to resolve the error. To determine if there is an auto correction option to resolve the error, the rule processing engine 306 may map the dial home event to a set of rules for auto correction. If no corrective action is associated with a rule, then the rule processing engine 306, via the rule engine 304, informs the health monitoring system 302 to generate a notification that the error is genuine and service is needed. The health monitoring system 302 will generate the notification and transmit the notification to a service agent associated with the service provider. If a corrective action is associated with a rule, then the corrective action is forwarded to the client device 208 or the shared resource 206 via the health monitoring system 302.

Figure 4:
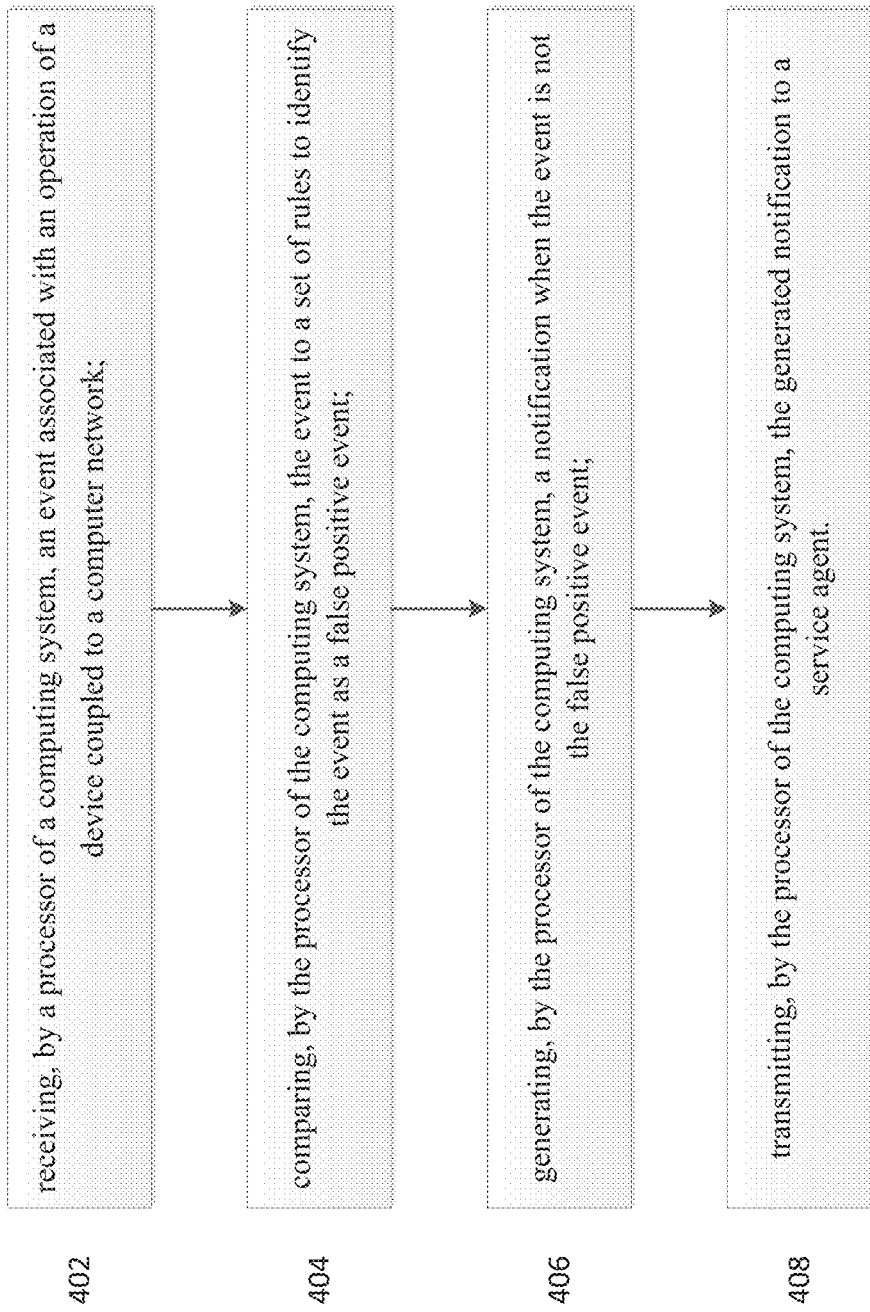
FIG. 4 is a flow diagram illustrating a method for monitoring the health of a device.

FIG. 4 is a flowchart that illustrates a method of determining a dial home event. Flowchart 400 illustrates method acts illustrated as flowchart blocks for certain steps involved in and/or between the clients 208/shared resource 206 and the monitoring station 204 of FIG. 2.

At 402, the central monitoring station receives an event associated with the operation of the device. The event may be a dial home event or any other event indicating a need for the device to be serviced by a service agent.

At 404, the central monitoring station compares the event to a set of rules to identify if the event is a false positive event. If the event is a false positive, the device has incorrectly indicated the device needs servicing. For example, a computer may heat up and trigger an event. The event may indicate that the computer is overheating and service is required. However, in some circumstances, the computer may heat up for a moment and return to a homeostasis within a few minutes. In such a situation, the computer may not need servicing. Since the event was triggered, but the computer does not need servicing, as the issue has been resolved, this event is considered a false positive event.

In one embodiment, when the system has identified the occurrence of an event, the event is mapped to a set of rules. The rules may require that the system check to see if the device associated with the event still needs servicing. For example, the health monitoring system may retrieve additional information regarding the operation status of the device associated with the event when the event is determined to be a false positive event. The rules, in another example, may required the health monitoring system to re-monitor the device associated with the event, compare the event to a set of rules a second time, or remove the device from the network when the event is determined to be a false positive. When the device is removed from the network, the communication between the network and the device may be severed.

At 406, when the event is identified as not a false positive event, the event is considered a genuine error, and the health monitoring system generates a notification that the error has occurred on the device associated with the event and servicing is needed. In one embodiment, the notification includes other pertinent information so that the service agent may provide corrections. For example, if a computer overheats and creates genuine error, the notification may include how hot the computer is, traffic processed by the network associated with the computer, CPU usage, memory usage and any other pertinent information.

At 406, the health monitoring system may transmit the generated notification to a service agent or a service provider when the event is a genuine error. In one embodiment, the health monitoring system may also determine if there are any auto corrective options for the event by comparing the event to a set of rules associated with auto corrections. If a corrective option is available, the health monitoring system may include this information in the notification and/or send the device associated with the event an auto corrections fix. For example, if the health monitoring system receives an genuine error indicating that a computer is overheating, the health monitoring system may determine an auto corrective solution to the error would be to power down the computer. The health monitoring system may send instructions to the computer associated with the event to power down.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method comprising:
   receiving, by a processor of a computing system, a dial home event associated with operation of a device coupled to a computer network, the dial home event being received over the computer network and further requesting assistance from a service agent to address a potential problem with the device;
   comparing, by the processor of the computing system, the dial home event to a set of rules to determine whether to identify the dial home event as a false positive event;
   if the comparison determines that the dial home event is not a false positive event:
      comparing, by the processor of the computing system, the dial home event to a second set of rules to identify at least one automatic correction;
      transmitting, by the processor of the computing system, the at least one automatic correction to the device;
      generating, by the processor of the computing system, a notification for the service agent;
      adding, by the processor of the computing system, a new rule to the set of rules specifying that the dial home event is a new false positive event when the dial home event is a false positive;
   if the comparison determines that a false positive event occurred:
      skipping, by the processor of the computing system, generation of the notification for the service agent due to the occurrence of the false positive event; and
      transmitting, by the processor of the computing system, the generated notification to the service agent due to the dial home event being identified as an event that is not false positive.

2. The method of claim 1, further comprising:
   retrieving, by the processor of the computing system, information associated with the operation of the device when the dial home event is identified as the false positive event; and
   transmitting, by the processor of the computing system, the retrieved information to the service agent.

3. The method of claim 1, wherein the device is removed from the computer network when the event is identified as the false positive event.

4. The method of claim 1, further comprising:
   performing a second comparison of the event and the set of rules when the dial home event has been identified as the false positive event.

5. The method of claim 1,
   wherein each rule of the set of rules is written in declarative syntax.

6. A computer program product comprising a non-transitory computer-readable medium having a computer-readable program code embodied therein to be executed by one or more processors, the program code including instructions to:
   receive a dial home event associated with an operation of a device coupled to a computer network, the dial home event being received over the computer network and further requesting assistance from a service agent to address a potential problem with the device; and
compare the dial home event to a set of rules to determine whether to identify the dial home event as a false positive event;
if the comparison determines that the dial home event is not a false positive event:
 compare the dial home event to a second set of rules to identify at least one automatic correction;
 transmit the at least one automatic correction to the device;
 generate a notification for the service agent;
 add a new rule to the set of rules specifying that the dial home event is a new false positive event when the dial home event is a false positive;
if the comparison determines that a false positive event occurred:
 skip generation of the notification for the service agent due to the occurrence of the false positive event; and
transmit the generated notification to the service agent due to the dial home event being identified as an event that is not false positive.

7. The computer program product of claim 6, wherein the program code includes further instructions to:
retrieve, by the processor of the computing system, information associated with the operation of the at least one device when the dial home event is identified as the false positive event; and
transmit, by the processor of the computing system, the retrieved information to the service agent.

8. The computer program product of claim 6, wherein the device is removed from the network when the dial home event is identified as the false positive event.

9. The computer program product of claim 6, wherein the program code includes further instructions to:
perform a second comparison of the dial home event and the set of rules when the event has been identified as the false positive event.

10. The computer program product of claim 6, wherein each rule of the set of rules is written in declarative syntax.

11. A system comprising:
a processor-based application, which when executed on a computer, will cause the processor to:
 receive a dial home event associated with an operation of a device coupled to a computer network, the dial home event being received over the computer network and further requesting assistance from a service agent to address a potential problem with the device;
 compare the dial home event to a set of rules to determine whether to identify the dial home event as a false positive event;
 if the comparison determines that the dial home event is not a false positive event:
  compare the dial home event to a second set of rules to identify at least one automatic correction;
  transmit the at least one automatic correction to the device;
  generate a notification for the service agent;
  add a new rule to the set of rules specifying that the dial home event is a new false positive event when the dial home event is a false positive;
 if the comparison determines that a false positive event occurred:
  skip generation of the notification for the service agent due to the occurrence of the false positive event; and
 transmit the generated notification to the service agent due to the dial home event being identified as an event that is not false positive.

12. The system of claim 11, wherein the processor-based application, when executed on the computer, will further cause the processor to:
retrieve information associated with the operation of the device when the dial home event is identified as the false positive event; and
transmit the retrieved information to the service agent.

13. The system of claim 11, wherein the device is removed from the computer network when the dial home event is identified as the false positive event.

14. The system of claim 11, wherein the processor-based application, when executed on the computer, will further cause the processor to:
perform a second comparison of the dial home event and the set of rules when the dial home event has been identified as the false positive event.

15. The method of claim 1, wherein the false positive event comprises a first operation status of the device that indicates existence of the potential problem with the device and a subsequent second operation status of the device that indicates absence of the potential problem with the device.

16. The method of claim 1, further comprising:
prior to receiving the dial home event associated with operation of the device:
 receiving a first status of the operation of the device during a first device monitoring interval; and
wherein receiving the dial home event associated with operation of the device comprises:
 receiving a second status of the operation of the device during a subsequent second device monitoring interval, the second status of the operation of the device indicative of the dial home event.

* * * * *